United States Patent
Yu Chen

(12) United States Patent     (10) Patent No.: US 7,328,776 B2
Yu Chen     (45) Date of Patent: Feb. 12, 2008

(54) BRAKE DEVICE FOR A STRAP-REEL FRAME

(76) Inventor: Hsiu-Man Yu Chen, No. 27, Sec. 1, Ta Fu Road, Tan Tzu Hsiang, Taichung (TW) 427

( * ) Notice: Subject to any disclaimer, the term of this patent is extended or adjusted under 35 U.S.C. 154(b) by 261 days.

(21) Appl. No.: 11/150,132

(22) Filed: Jun. 13, 2005

(65) Prior Publication Data

US 2006/0278479 A1    Dec. 14, 2006

(51) Int. Cl.
    *B65H 59/00*    (2006.01)
(52) U.S. Cl. .......................... 188/64; 188/74; 188/139
(58) Field of Classification Search .............. 188/64, 188/74, 135, 139, 250 B; 242/421.8, 422.4, 242/156.2; 403/65, 66, 68, 161, 163, 263
See application file for complete search history.

(56) References Cited

U.S. PATENT DOCUMENTS

| | | | | |
|---|---|---|---|---|
| 564,228 A | * | 7/1896 | Sparling | ....................... 403/68 |
| 2,087,928 A | * | 7/1937 | Spencer et al. | .......... 242/575.5 |
| 2,504,046 A | * | 4/1950 | Rabinow | ................. 242/422.4 |
| 2,664,305 A | * | 12/1953 | Hobart | ........................ 403/161 |
| 3,069,107 A | * | 12/1962 | Hirt | ........................ 242/422.4 |
| 3,351,302 A | * | 11/1967 | Lang | ....................... 242/156.2 |
| 5,566,793 A | * | 10/1996 | Kahr | ....................... 188/250 B |
| 6,905,089 B1 | * | 6/2005 | Solis et al. | .............. 242/421.8 |
| 7,108,218 B2 | * | 9/2006 | Chapman et al. | ........ 242/421.8 |

* cited by examiner

Primary Examiner—Thomas Williams
(74) Attorney, Agent, or Firm—Ming Chow; Sinorica, LLC

(57) ABSTRACT

A brake device for a strap-reel frame is installed on the frame body of the strap-reel frame for braking the inner and the outer disc pivotally fitted on the horizontal shaft of the frame body. The brake device includes a swinging rod having one end pivotally connected with a preset portion of the frame body above the horizontal shaft and able to be actuated to swing downward by its own gravity. The swinging rod has its intermediate portion fixed with two brake blocks able to be moved downward together with the swinging rod to push against the outer circumferential edge of the inner disc and stop the inner disc from rotating.

5 Claims, 5 Drawing Sheets

BRAKE DEVICE FOR A STRAP-REEL FRAME

BACKGROUND OF THE INVENTION

1. Field of the Invention

This invention relates to a brake device for a strap-reel frame, particularly to one able to brake the inner disc of the strap-reel frame by means of a swinging rod actuated to swing downward by its own gravity.

2. Description of the Prior Art

Generally, a conventional strap-reel frame includes a frame body having its upper end fixed with a horizontal shaft for an inner and an outer disc to be fitted thereon. A packaging strap is installed between the inner and the outer disc, and a clamping device is fixed on the frame body for clamping the outer end of the packaging strap to prevent it from falling off.

However, although the conventional strap-reel frame is provided with a clamping device for clamping the packaging strap, yet there is not any device provided for braking the inner and the outer disc. Thus, when the inner and the outer disc are forced to rotate by an external force or actuated to rotate by inertia due to pulling and releasing of the packaging strap, the strap positioned between the inner and the outer disc may become slack and disordered, affecting sequent use of the packaging strap.

SUMMARY OF THE INVENTION

The objective of the invention is to offer a brake device for a strap-reel frame, which is installed on the fame body of the strap-reel frame for braking and fixing the inner and the outer disc pivotally fitted on the horizontal shaft of a frame body. The brake device includes a swinging rod having one end pivotally connected with a preset portion of the frame body above the horizontal shaft and able to be actuated to swing downward by its own gravity. The swinging rod has its intermediate portion fixed with at least one brake block able to be moved downward together with the swinging rod for pushing against the outer circumferential edge of the inner disc and stop the inner disc from rotating. The brake device in the present invention is able to prevent the inner and the outer disc from rotating by an external force or rotating by inertia due to drawing of the packaging strap, avoiding the packaging strap becoming slack and disordered and facilitating sequent use of the packaging strap.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
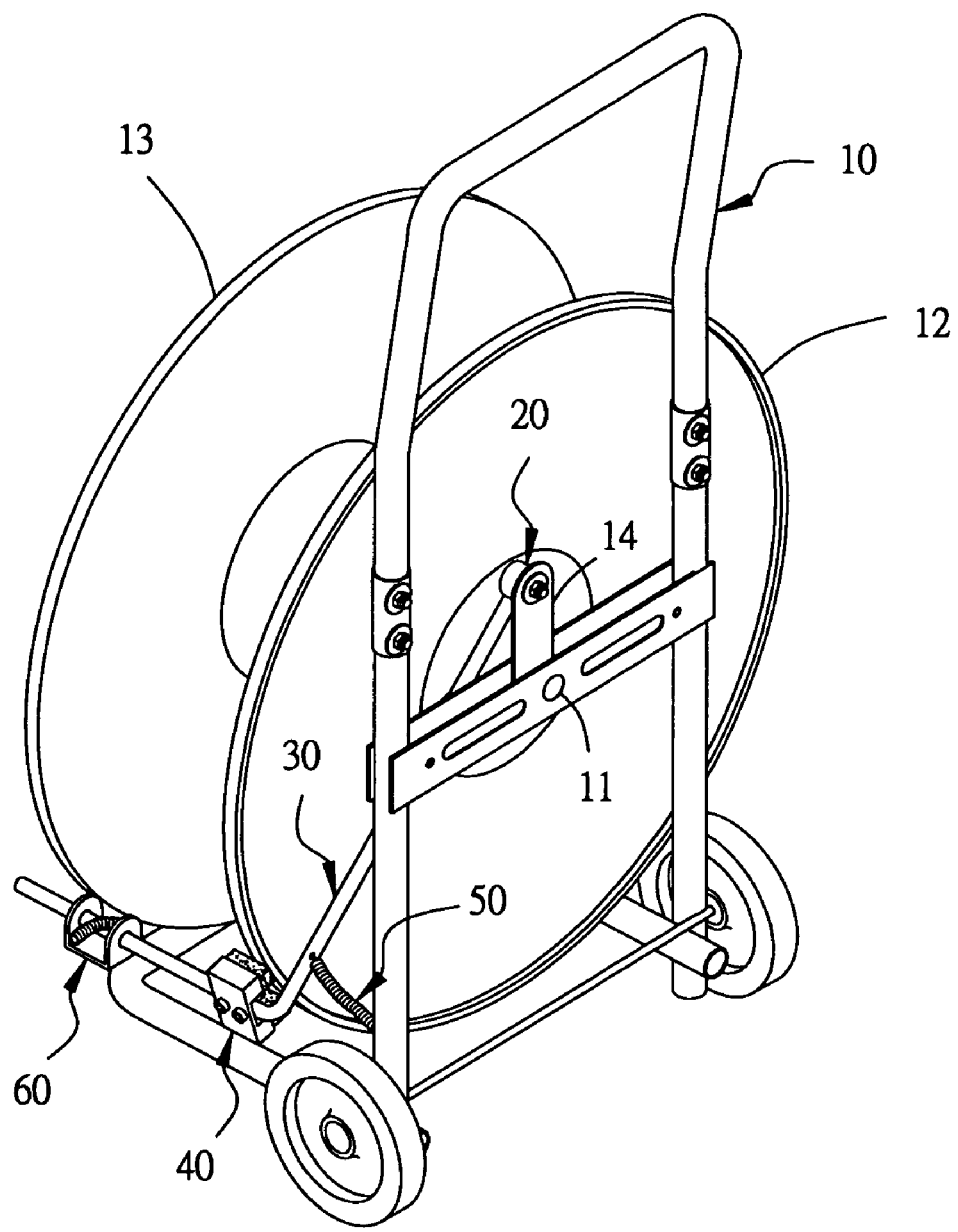
FIG. 1 is a perspective view of a strap-reel frame in the present invention.
Figure 2:
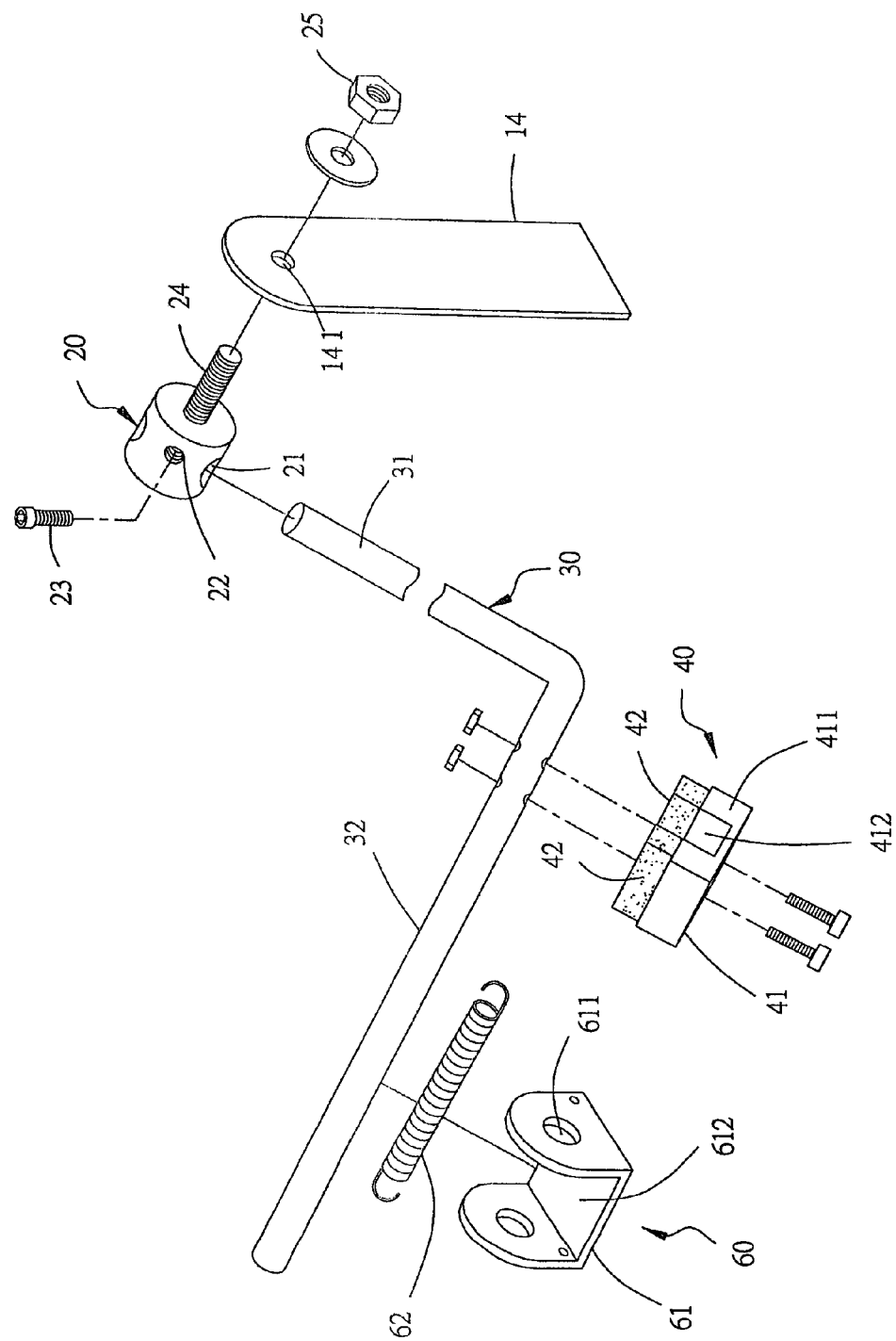
FIG. 2 is an exploded perspective view of a brake device for a strap-reel frame in the present invention.

A preferred embodiment of a brake device for a strap-reel frame in the present invention, as shown in FIGS. 1 and 2, is installed with the frame body 10 of the strap-reel frame for braking the inner and the outer disc 12, 13 pivotally assembled on the horizontal shaft 11 of the frame body 10. The brake device includes the frame body 10, a rotary member 20, a swinging rod 30, a brake unit 40, an extension spring 50 and a strap-clamping unit 60 combined together.

The frame body 10 is provided with a vertical basic plate 14 above the horizontal shaft 11 at the outer side of the inner disc 12. The vertical basic plate 14 has its upper end bored with a through hole 141.

The rotary member 20 is column-shaped and has its outer edge diametrically bored with an insert hole 21 and a threaded hole 22 crossing and communicating with the insert hole 21, with a bolt 23 screwed in the threaded hole 22. Further, the rotary member 20 has one end fixed with a threaded rod 24 extending outward horizontally to insert through the through hole 141 of the basic plate 14 and screwed with a position-limiting nut 25 to enable the rotary member 20 to rotate freely in the through hole 141 of the basic plate 14.

The swinging rod 30 is L-shaped and formed with a first section 31 and a second section 32 formed by bending and extending from the first section 31. The first section 31 of the swinging rod 30 has its free end inserted in the insert hole 21 of the rotary member 20 and fixed therein by the bolt 23 on the rotary member 20. The second section 32 of the swinging rod 30 extends outward horizontally from the outer circumferential edge of the inner disc 12 to the outer circumferential edge of the outer disc 13.

The brake unit 40 includes a U-shaped base 41 having its opposite projecting sides 411 respectively fixed thereon with a brake block 42. The U-shaped base 41 has its central recessed portion 412 fixed in a deflecting mode with the second section 32 of the swinging rod 30 near the bent portion to enable the U-shaped base 41 to move bias at the opposite sides of the swinging rod 30. Thus, when the U-shaped base 41 and its brake blocks 42 are actuated to move downward together with the swinging rod 30, the two brake blocks 42 on the opposite sides of the U-shaped base 41 can be properly adjusted to move bias to push against the outer circumferential edge of the inner disc 12 and stop the inner disc 12 from rotating.

The extension spring 50 has one end hooked with a proper portion of the frame body 10 and the other end hooked with a corresponding portion of the first section 31 of the swinging rod 30. Thus, when moved upward, the swinging rod 30 can be pulled and restricted in position by the extension spring 50.

The strap-clamping unit 60 includes a U-shaped clamping base 61 having its opposite sides respectively bored with a comparatively large insert hole 611 for the second section 32 of the swinging rod 30 to be inserted therethrough. A spring 62 has its two ends respectively and diagonally hooked with the opposite bottom sides of the clamping base 61 and obliquely positioned on the swinging rod 30 for elastically clamping the outer end of a packaging strap passing through between the intermediate transverse plate 612 of the clamping base 61 and the swinging rod 30.

Figure 3:
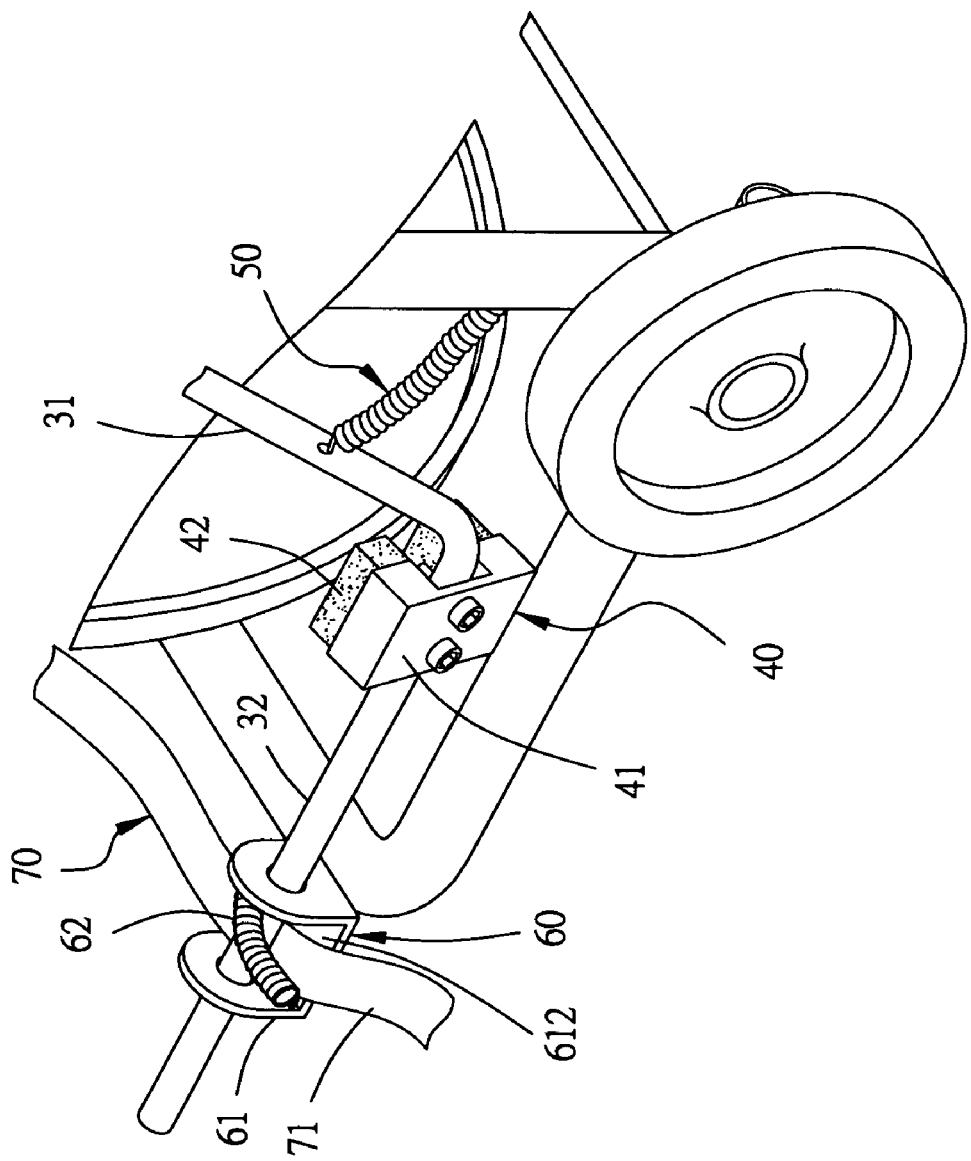
FIG. 3 is a partial perspective view of the brake device for a strap-reel frame in a strap clamping and disc braking condition in the present invention.
Figure 4:
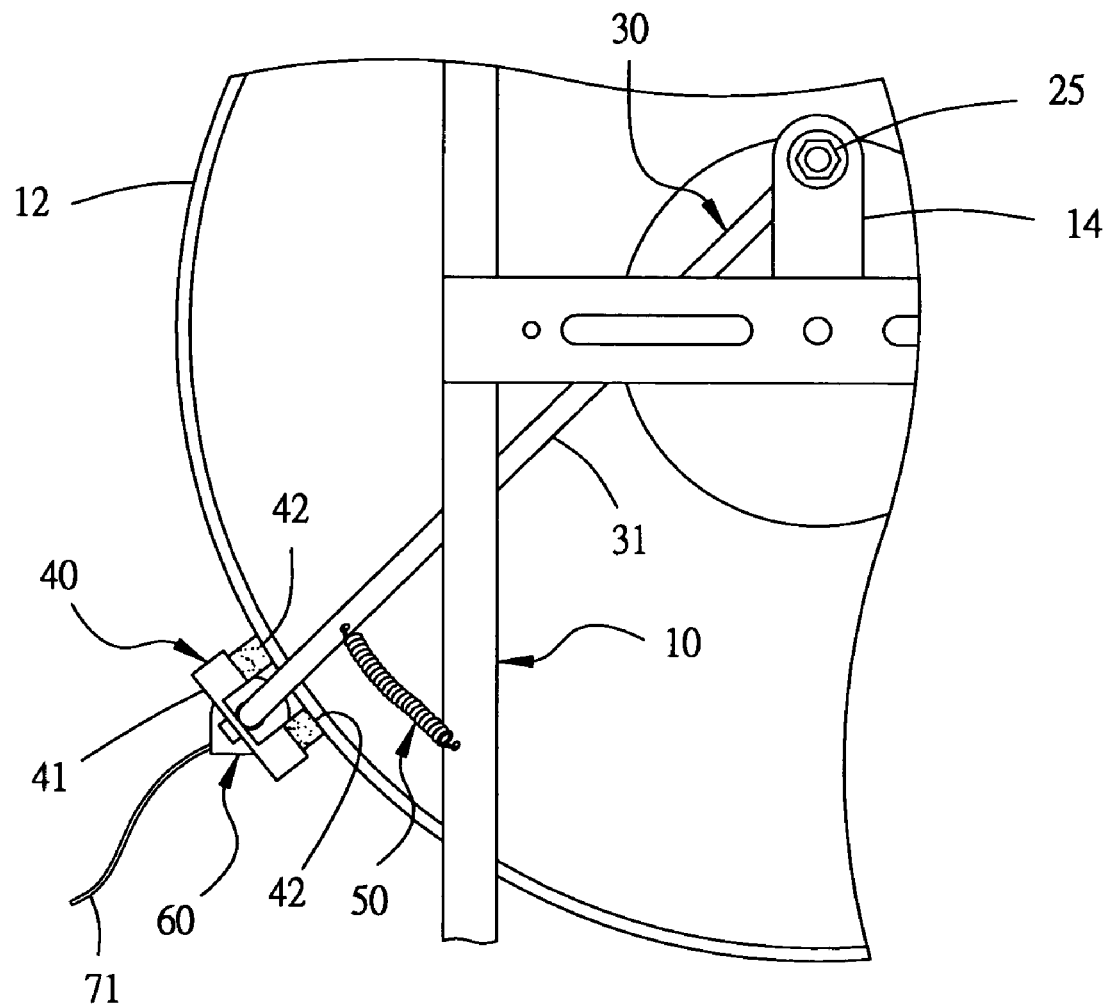
FIG. 4 is a side cross-sectional view of the brake device for a strap-reel frame in a strap clamping and disc braking condition in the present invention.

In using, as shown in FIGS. 3 and 4, after a packaging strap 70 is assembled on between the inner and the outer disc 12, 13, the outer end 71 of the packaging strap 70 is pulled outward to pass through between the intermediate transverse plate 612 of the clamping base 61 and the second section 32 of the swinging rod 30 and be clamped in position by the resilience of the spring 62 obliquely pressed on the swinging rod 30. Since the first section 31 of the swinging rod 30 has its free end fixed with the rotary member 20 that is pivotally connected with the basic plate 14, the swinging rod 30, by the gravity of its own and of the brake unit 40 and with the jointing portion of the rotary member 20 and the basic plate 14 serving as a pivot, can swing downward to let the two brake blocks 42 on the opposite sides of the swinging rod 30 move near to the outer circumferential edge of the inner disc 12. At this time, the two brake blocks 42 can be adjusted to move bias to push against the outer circumferential edge of the inner disc 12 and stop the inner disc 12 together with the outer disc 13 and the packaging strap 70 from rotating, able to prevent the inner and the outer disc 12, 13 from rotating randomly by an external force or rotating by inertia due to pulling of the packaging strap 70 to avoid the packaging strap 70 becoming slack and disordered.

In addition, the swinging rod 30 together with the two brake blocks 42 fixed thereon can be adjusted in position to meet the requirements of braking of different-sized inner and outer disc 12, 13. In case the inner and the outer disc 12, 13 have a comparatively large outer diameter, only unscrew the bolt 23 on the rotary member 20 and adjust the position of the swinging rod 30 in the insert hole 21 of the rotary member 20 to lengthen the protruding-out portion of the swinging rod 30 to enable the two brake blocks 42 to push against the outer circumferential edge of the inner disc 12 and then screw tight the bolt 22 again.

Figure 5:
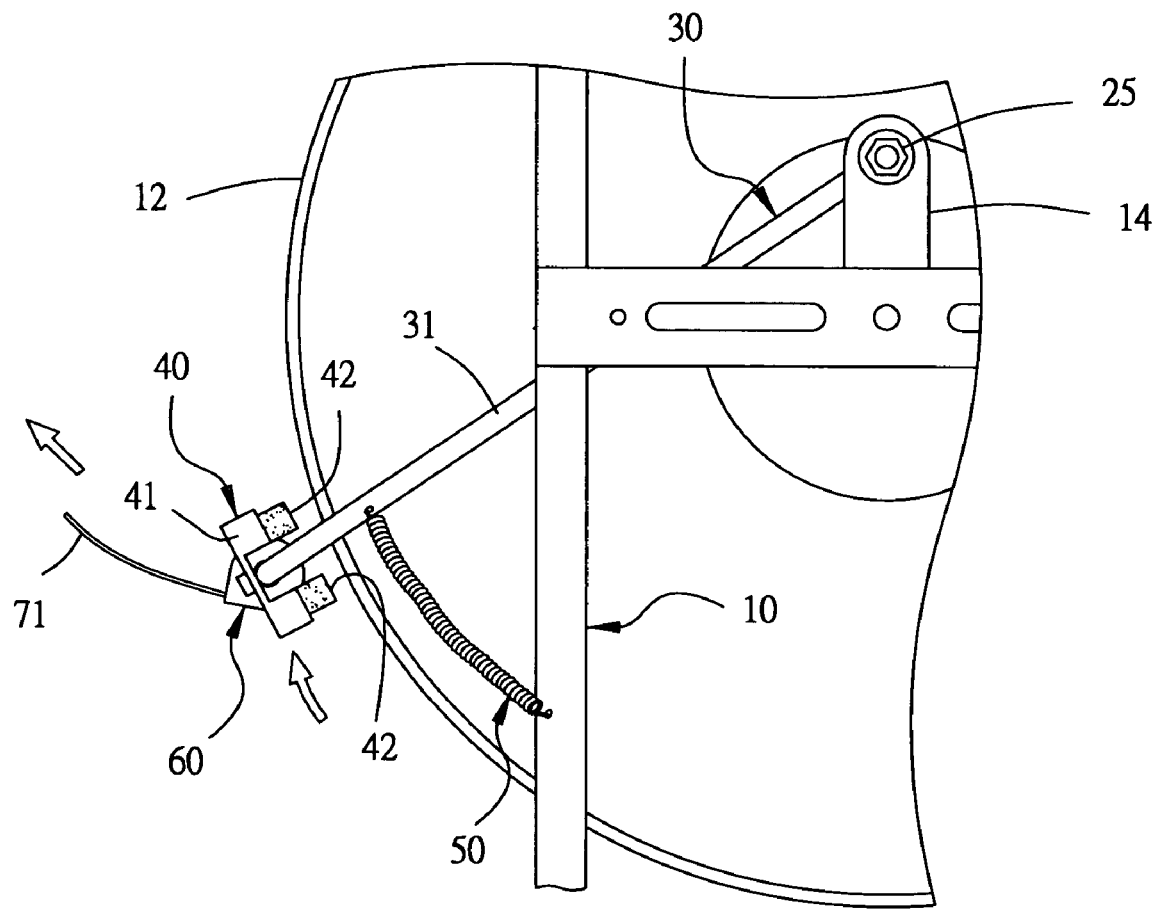
FIG. 5 is a side cross-sectional view of the brake device for a strap-reel frame in a strap pulling and brake releasing condition in the present invention.

To use the packaging strap 70 assembled on between the inner and the outer disc 12, 13, as shown in FIG. 5, only apply force to pull outward the end 71 of the packaging strap 70, thus able to overcome the elastic clamping force of the clamping unit 60. Simultaneously, the swinging rod 30, with the joint portion of the rotary member 20 and the basic plate 14 serving as a pivot, will swing upward and actuate the brake blocks 42 to move away from the outer circumferential edge of the inner disc 12 to release braking of the inner disc 12 and let the packaging strap 70 pulled outward smoothly. When the packaging strap 70 is loosened, the packaging strap 70 will be again clamped by the elastic clamping force of the clamping unit 60 and the inner disc 12 will be braked again by the brake blocks 42 actuated to move downward together with the swinging rod 30.

To sum up, the packing strap 70 can be elastically clamped in position by means of the clamping unit 60, and the inner and the outer disc 12, 13 can be automatically stopped from rotating by means of the brake blocks 42 on the swinging rod 30, preventing the packaging strap 70 from becoming slack and disordered and facilitating sequent use of the packaging strap 70.

While the preferred embodiment of the invention has been described above, it will be recognized and understood that various modifications may be made therein and the appended claims are intended to cover all such modifications that may fall within the spirit and scope of the invention.

I claim:

1. A brake device for a strap-real frame assembled on a frame body of said strap-real frame, said brake device braking an inner and an outer disc pivotally filled on a horizontal shaft of said frame body, said brake device comprising: a swinging rod having one end pivotally connected with said frame body located above said horizontal shaft, said swinging rod actuated to swing downward by its own gravity: and at least one brake block disposed at an intermediate portion of said swinging rod, said brake blocks moved downward together with said swinging rod to push against the outer circumferential edge of said inner disc, said brake blocks stopping said inner disc from rotating, wherein said swinging rod has its free end fixed thereon with a U-shaped clamping base having its opposite sides respectively bored with a comparatively large insert hole for an outer end of said swinging rod to be inserted therethrough, a spring diagonally fastened between the opposite lower sides of said clamping base, said spring obliguely and elastically pressed on said swinging rod, said spring elastically clamping the end of a packaging strap passing through between an intermediate transverse plate of said U-shaped clamping base and said swinging rod.

2. The brake device for a strap-real frame as claimed in claim 1, wherein said swinging rod has its pivotal connecting end diametrically inserted through a rotary member and locked therein by a locking bolt on said rotary member, said rotary member pivotally connected with a basic plate of said frame body.

3. The brake device for a strap-real frame as claimed in claim 1, wherein said brake device has said two brake blocks respectively secured on opposite projecting sides of a U-shaped base having its central recessed portion fixed in a deflecting mode with said swinging rod, said two brake blocks pushing against the outer circumferential edge of said inner disc and stopping said inner disc from rotating when they are moved downward together with said swinging rod.

4. The brake device for a strap-real frame as claimed in claim 1, wherein said swinging rod is L-shaped and formed with a first section and a second section, said first section of said swing rod pivotally connected with said frame body, said second of said swinging rod formed by bending and extending from said first section, said brake blocks installed on said second section at a location near said bending portion of said swinging rod.

5. The brake device for a strap-real frame as claimed in claim 1, wherein an extension spring has one end hooked with a preset portion of said frame body and the other end hooked with a corresponding portion of said swinging rod, said extension spring pulling and restricting said swinging rod in position when said swinging rod is moved upward.

* * * * *